Sept. 25, 1956  G. H. SLATTERY  2,764,488
METHOD AND APPARATUS FOR FREEZING
SOLVENTS OUT OF SOLUTIONS
Filed Jan. 24, 1951  4 Sheets-Sheet 4
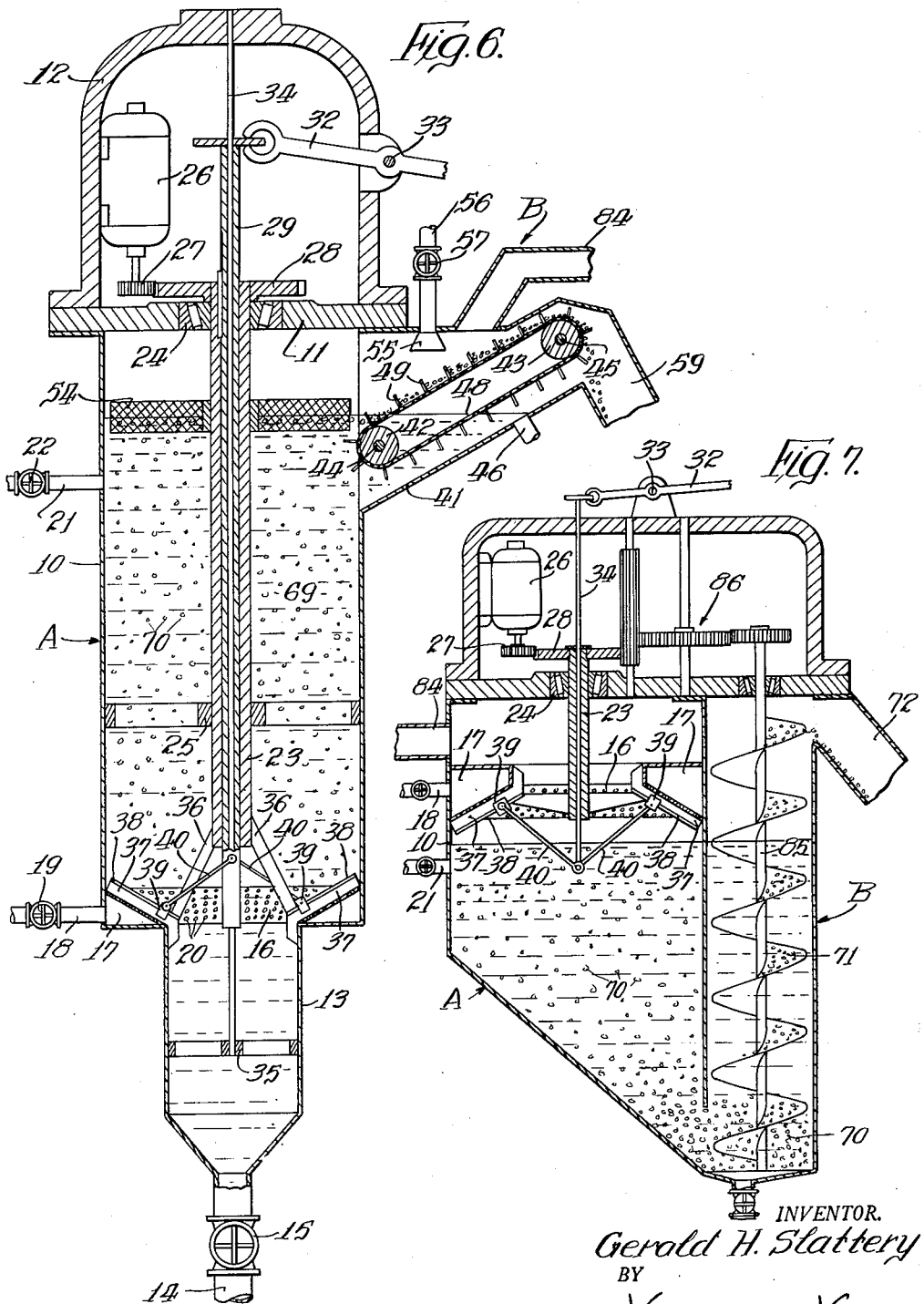
INVENTOR.
Gerold H. Slattery
BY
Attys

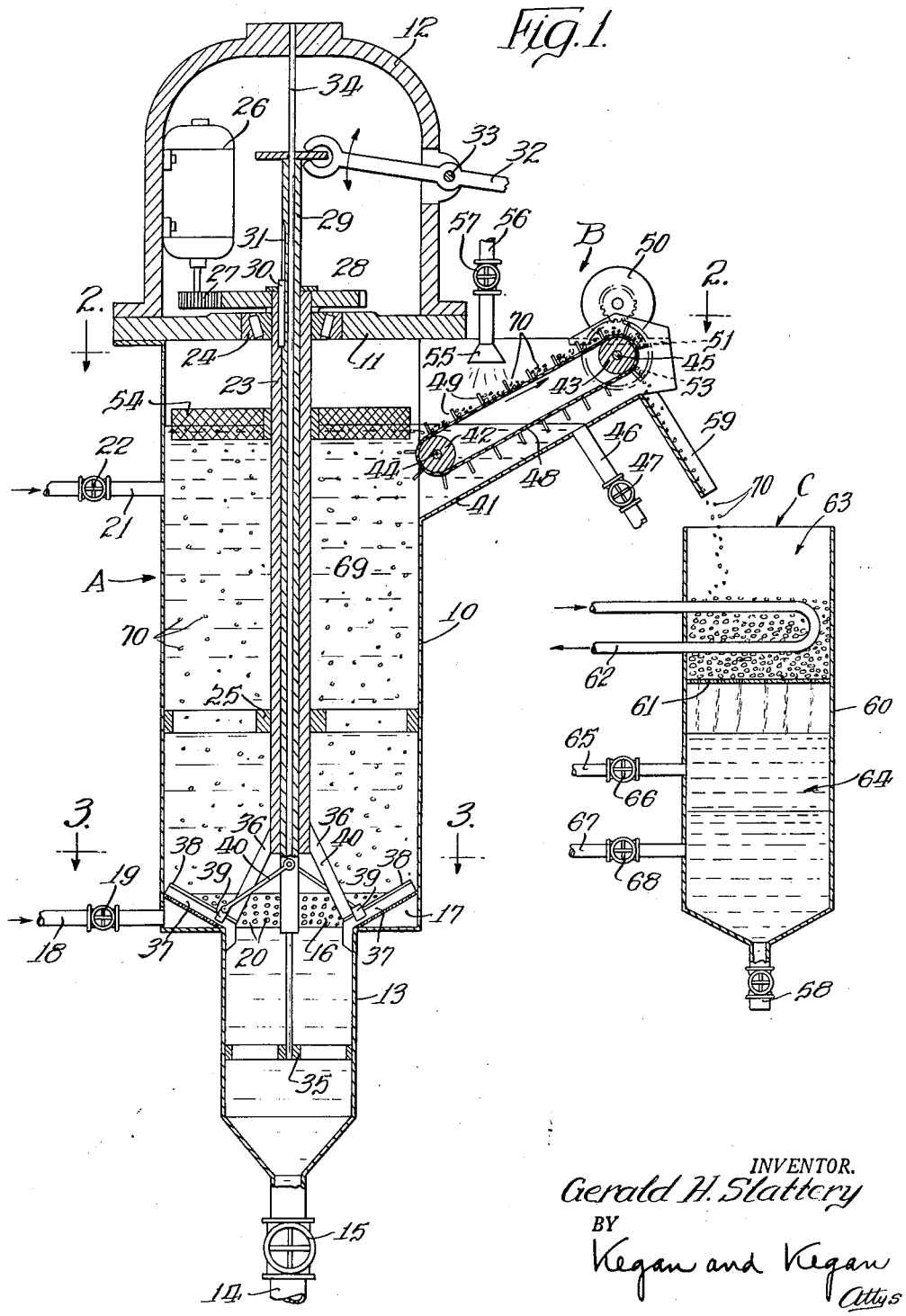

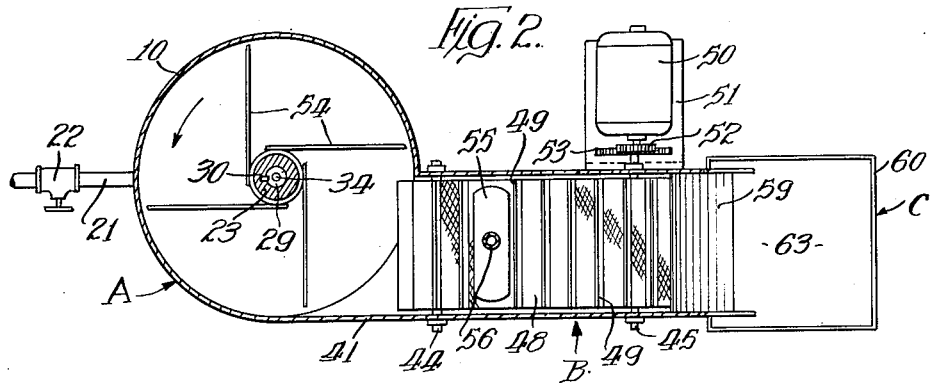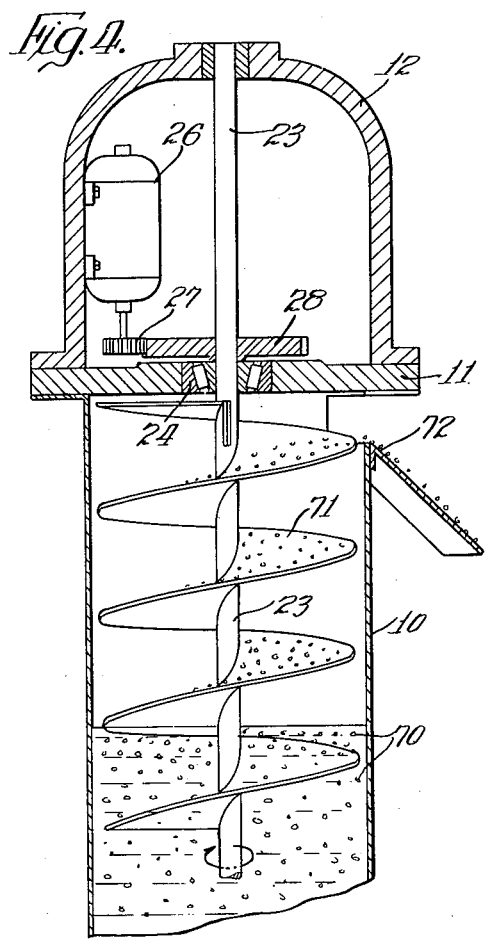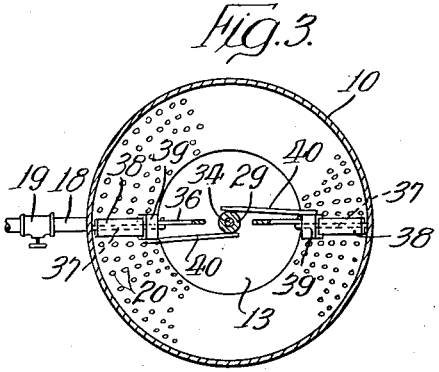

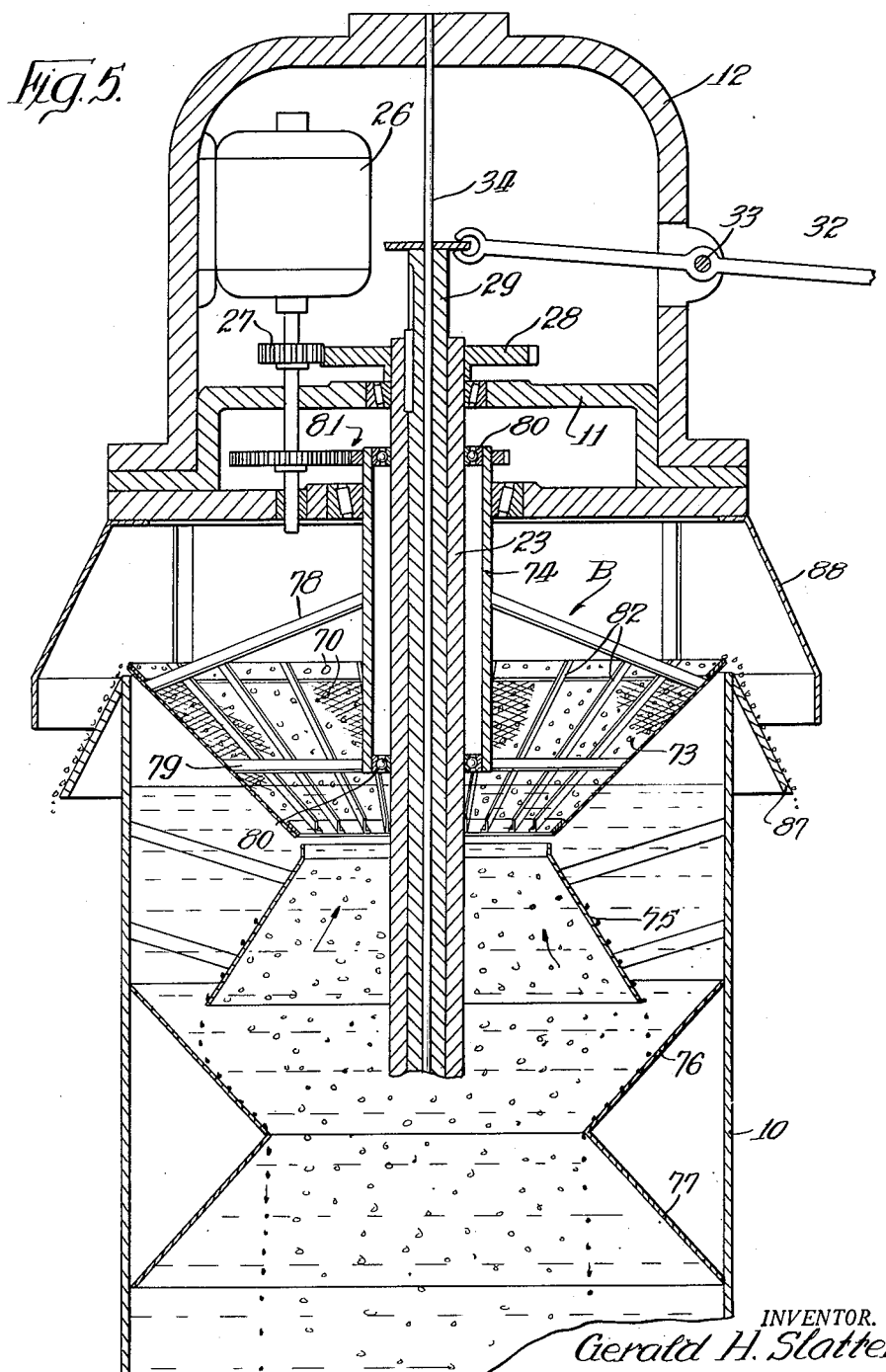

United States Patent Office 2,764,488
Patented Sept. 25, 1956

2,764,488

METHOD AND APPARATUS FOR FREEZING SOLVENTS OUT OF SOLUTIONS

Gerald H. Slattery, Paw Paw, Mich.

Application January 24, 1951, Serial No. 207,564

11 Claims. (Cl. 99—192)

This invention relates to methods and apparatus for freezing solvents out of fluid solutions.

It is the principal object of this invention to provide an improved method and apparatus for freezing solvents such as water out of fluid foodstuffs such as orange juice, and other fluid mixtures having similar physical properties, in order to concentrate the food stuff or analogous mixture.

It is a further object of this invention to provide an improved method and apparatus for this purpose which is adapted to operate on a continuous flow basis, at low cost.

A still further object of this invention is to provide an improved method and apparatus of this kind capable for use with a freezer liquid that is of either a lower or higher specific gravity than the specific gravity of the fluid mixture being treated.

A special object of this invention is to provide an improved method and apparatus of this kind which is particularly suitable for use in concentrating fruit and vegetable juices and analogous fluid nutrients with no impairment of flavor or wholesomeness.

In accordance with the prior art, the solvent of certain solutions is frozen out of the solutions, thus either concentrating the remaining solution or liberating the solute from said solutions. The prior art has performed this process by exposing the solution, which is at its freezing point, to a colder solid surface such as for example the surface of an internally cooled drum which is immersed in the solution, or the inner surface of the solution container. The solvent from these solutions would then, under the proper conditions, freeze out of solution in the form of solvent ice on the cold solid surface. I have discovered the unexpected fact that the solvent will freeze out in the form of a crust on the surface of a cold immiscible liquid particle which is immersed in such a solution. I have utilized this unexpected discovery to remove the solvent from solutions including solutions containing suspended solids, by the simple procedure of continually injecting a cold immiscible liquid into the material being acted upon and by continuously removing from the material under treatment the immiscible liquid droplets covered with frozen solvent.

In its broadest aspect, this new method and apparatus for freezing solvents out of fluid solutions therefore involves continuously passing a stream of relatively low-temperatured, immiscible liquid in the form of droplets through a constant flow of the solution being concentrated, and separately removing the solvent-coated droplets and the concentrate. Where the low-temperatured, solvent-removing liquid is of lower specific gravity than the solution, the solvent-encrusted liquid is removed from the surface of the treated solution and the remaining concentrate is removed from the bottom of the container wherein the streams of solution and freezer liquid intermingle. Where the low-temperatured, solvent-removing liquid is of higher specific gravity than the treated solution, both the solvent-coated liquid and the remaining concentrate will have to be extracted from below said liquid surface.

The solvent-removing substance is introduced into the solution preferably in the form of droplets or spheroids of comparatively smaller diameter.

Obviously, the effective carrying out of the procedure for any of the hereinbefore-mentioned objects will require not only an appropriately-arranged container for the solution but suitable valve-controlled supply and removal conduits for the freezer liquid and the solution and conveyor means for directing the solvent-coated freezer liquid from the point of its liberation from the treated solution to a discharge conduit.

As will be made more apparent presently, the form and arrangement of the container and of these removal conduits and the conveyor will depend upon the particular end being sought, i. e., whether the securing of a concentrate or the extraction of a solvent or a solute.

The character of the solvent-removing liquid generally would depend somewhat upon the character of the solution from which the solvent is to be extracted. Where the solution being treated is a fruit or vegetable juice or other food product, it is important that the substance used to freeze out the solvent be of a non-toxic character and leave no toxic residues in the concentrate. Such liquids as deodorized mineral oil and certain liquid silicones (polydimethyl siloxanes) have been used to good advantage.

If only a limited amount of solvent is removed, all of the solute may remain in solution, but the material under treatment becomes more concentrated. If the pure solute is a solid, concentration of solutions thereof ultimately will result in saturation of the solution, and then, if solvent removal continues, barring eutectic limitations, in precipitation of the solid solute from the solution. These principles form the basis for the operation of a continuous crystallizer using the freeze concentration method of solvent removal.

If the solute is a gas, continued removal of the solvent by freezing will result in the liberation of the solute gas. This method of separating solvent from a gas solute has certain inherent advantages over thermal-pressure methods for solvent-gas solute separations which make the freezing method of separation preferable and most interesting commercially.

If the solute is a liquid which is only partially miscible with the solvent, continued removal of the solvent by freezing will result in the separation of the liquid solute. This separated liquid solute will float to the top of the solution if its (solute) density is less than that of the solution or the liquid solute will sink to the bottom of the solution and form its own layer if its density is greater than that of the solution.

By freezing out the solvent content of a solution, such as, for example, the water content of a fruit or vegetable juice (which may be considered a solution having substantially insoluble solid matter therein), rather than driving off the solvent by heat, as suggested by the prior art, three important advantages are realized. First, instead of expending approximately 540 calories of heat to evaporate each gram of water from the solution, it is only necessary to remove approximately 80 calories of heat in the formation of one gram of ice. Second, said juices normally contain some thermally unstable compounds which decompose at the moderate to high temperatures used in evaporators but which are not adversely affected by the cool temperatures used in a freeze concentrator. Third, evaporative processes "steam distill" out certain essential oils from the juices, a wasteful process which is avoided when freeze concentration is used. Present conventional freeze concentration processes and the concentrators based on such processes have very low concentration or freezing rates because the heat transfer takes place indirectly (through a metal wall) and because the continual building up of an ice crust on the heat transfer surface increases the thermal resistance of the heat transfer surface. All of these disadvantages of the prior art are avoided by this novel freezing process.

By way of illustration only and not for limitation purposes the following examples involving this improved process are given here.

Example A

At equilibrium operating conditions, 4 liters per minute of fresh, unconcentrated orange juice were cooled to +5° C. and then conducted to a freeze solvent remover of the general design herein shown. A light, deodorized, dekerosenized mineral oil at −20° C. was introduced into the bottom portion of the freeze solvent remover at the constant rate of 53.2 liters per minute. This mineral oil was injected into the orange juice mixture in the freeze solvent remover in the form of droplets or spheroids of approximately 1.6 mm. in diameter. Because the specific gravity of the mineral oil droplets was less than that of the orange juice, the droplets of mineral oil ascended through the orange juice and in so doing became individually encrusted with a thin coating of ice. A coating of ice also formed on the surface of the mineral oil distributing injector. This ice coating was continually scraped off the injector by mechanical scraper blades provided for this purpose. These ice scrapings and the ice encrusted mineral oil bubbles floated to the upper surface of the orange juice mixture in the freeze solvent remover where they were removed from said upper surface of the orange juice as fast as they accumulated thereon. Orange juice was drained from the bottom of the freeze solvent remover at the rate of 1 liter per minute. This effluent orange juice was found to have been concentrated to approximately one-fourth of its original volume. Following this, approximately three parts water to one part of orange juice were added to the concentrate, and the whole mixed thoroughly. Upon tasting the fruit juice thus prepared from the concentrate, it was found to have a taste, wholesomeness, and body comparable to the original fresh orange juice.

Example B

At equilibrium operating conditions, 500 cc./min. of fresh, unconcentrated grape juice was cooled to +5° C. and then conducted to a freeze solvent remover of the general design herein shown. A light, deodorized, dekerosenized mineral oil at −15° C. was introduced into the bottom portion of the freeze solvent remover at the constant rate of 7,620 cc./min. This mineral oil was injected into the grape juice mixture in the freeze solvent remover in the form of droplets or spheroids of approximately 3.0 mm. in diameter. Because the specific gravity of the mineral oil droplets was less than that of the grape juice, the droplets of mineral oil ascended through the grape juice and in so doing became individually encrusted with a thin coating of ice. A coating of ice also formed on the surface of the mineral oil distributing injector. This ice coating was continually scraped off the injector by mechanical scraper blades provided for this purpose. These ice scrapings and the ice encrusted mineral oil bubbles floated to the upper surface of the grape juice mixture in the freeze solvent remover where they were removed from said upper surface of the grape juice as fast as they accumulated thereon. Grape juice was drained from the bottom of the freeze solvent remover at the rate of 250 cc./min. This effluent grape juice was found to have been concentrated to approximately ½ of its original volume. Following this, approximately one part of water to one part of grape juice was added to the concentrate, and the whole mixed thoroughly. Upon tasting the fruit juice prepared from concentrate, it was found to have a taste, wholesomeness and body comparable to the original fresh grape juice.

The ice encrusted droplets which were removed from the solutions in each of the preceding examples were placed in a receptacle and heated. As the ice melted the resulting water and the mineral oil separated into two strata, because of the immiscible nature of the two liquids. The mineral oil was poured off for use in subsequent tests.

As hereinbefore noted, this new freezing process involves the use of a novel apparatus for practicing this invention, the advantages and capabilities of which will be pointed out as this description proceeds. For purpose of clarity in exposition, the following description is explicit and the accompanying drawings are comparatively detailed but it is to be distinctly understood that said exposition is illustrative only and that the invention is not restricted to the particular details recited in the specification or shown in the drawings.

In the accompanying drawings:

Fig. 1 is a front sectional view showing somewhat schematically one form of apparatus embodying this invention;

Fig. 2 is a plan view of same, taken on the line 2—2 of Fig. 1;

Fig. 3 is a cross-sectional view taken on the line 3—3 of Fig. 1;

Fig. 4 is a fragmentary vertical sectional view showing a modified form of conveyor means for removing the solvent-coated droplets of freezer liquid;

Fig. 5 is a vertical cross-sectional view showing a further modified form of the droplet-removing means;

Fig. 6 is a vertical sectional view of the form shown in Fig. 1, modified for use in recovering a gaseous solute; and Fig. 7 is a modified form of apparatus for use in recovering a gas solute where the freezer liquid is of a higher specific gravity than the solution being treated.

Any apparatus embodying this invention for use in carrying out any adaptation of this novel process generally would comprise a receptacle or container A, wherein the solution is to be subjected to the action of the freezer liquid, and an extractor means B for removing the solvent-coated freezer liquid droplets for delivery to a separator C where the frozen solvent and the freezer liquid are separated from one another.

The receptacle or container A for any of the modified forms of apparatus herein shown, is in the form of a cylindrical tank 10 on the upper end of which rests a platform 11 supporting a motor housing 12 and (except for the arrangement illustrated in Fig. 7) within the bottom of which is a perforate plate or partition 16 angularly disposed to provide a distributing injector chamber 17. At the bottom of the tank 10 is a sump 13 from which leads a discharge conduit 14 controlled by a valve 15. An inlet conduit 18, with a control valve 19, is arranged to admit the freezer liquid to the distributing injector chamber 17. Another inlet conduit 21, with a control valve 22, is arranged to admit the solution to be treated.

Concentrically within the tank, and extending axially thereof, are hollow shafts 23 and 29 and a guide shaft 34. The shaft 23 is rotatably journaled in bearings 24 and 25 and connected through gears 27 and 28 to a motor 26 mounted in the housing 12. The shaft 29, by a key 30 and keyway 31, is connected to rotate with the shaft 23 but be axially reciprocable relative thereto through the action of a crank 32 pivoted at 33 on the housing 12. The crank, of course, is connected to suitable means for effecting its oscillation. The guide shaft 34 is fixably secured at the upper end of the top of the housing 12 and at the lower end to a support 35.

The shaft 23 is connected by arms 36 to effect the rotation of scraper blades 37 over the perforate plate 16 to keep it free of the frozen solvent. The shaft 29 is connected by rods 40 to blocks 39 slidable on the upper rail portion 38 of the scraper blades 37 to free said blades from the accumulation of ice during the operation of the apparatus and thereby coact with the blades 37 to lessen the probabilities of ice forming on the plate 16 so as to clog the apertures 20 and prevent or improperly lessen the injection of the freezer liquid.

The extraction means B, for removing from the solution 69 the solvent-coated droplets of freezer liquid may embody different forms. For the modifications shown in Figs. 1 and 6 the extractor B includes an extension 41 at the upper top portion of the tank 10 and wherein is arranged an inclined conveyor belt 48 driven by a motor 50 and to which said solvent-coated droplets 70 are directed by an impeller 54 for conveyance by said conveyor belt 48 to a chute 59 discharging into the separator C.

The conveyor belt 48, mounting transverse plates 49, extends around pulleys 42 and 43 respectively mounted on shafts 44 and 45 journaled on the sides of the extension 41. The latter shaft is operatively connected to the motor 50 by gears 52 and 53. The motor 50 rests on a bracket 51 secured to the upper end of extension 41.

The impeller 54 is secured to the shaft 23 adjacent the inner end of the conveyor belt 48 and is rotated counter-clockwise so as to direct toward the conveyor belt 48 the solvent-coated droplets of the freezer liquid collecting on or near the surface of the solution 69 being treated.

An overflow conduit 46 controlled by a valve 47 is so arranged on the bottom of the extension 41 as to maintain the solution 69 in the receptacle 10 at a level which will insure the most efficient deflection of the solvent-coated droplets to the extractor means B.

A spray head 55, mounted on the end of a liquid supply line 56 and controlled by a valve 57, is suspended over the conveyor belt 48 so as to wash the solvent-coated droplets 70 free of any solute that might be adhering to the surface of these droplets. The washing liquid and the dislodged solute drain back into the tank 10.

The extractor B, for the modifications shown in Figs. 4 and 7, is in the form of an Archimedes screw 71, preferably perforated. In Fig. 4 rotary power is provided at the upper end of the shaft 23 and the screw is of a diameter but slightly less than that of the tank 10. In Fig. 7 this screw is arranged on a shaft 85 connected by gearing 86 to the motor 26. In the upper end of both tanks 10 is arranged a discharge opening for the solvent-coated droplets of freezer liquid and from which opening leads a chute 72 to the separator C.

In the modification shown in Fig. 5, the extractor B is in the nature of an inverted, frusto-conical, screen element 73 suspended from a shaft 74 the use of which necessitates an association of opposed frusto-conical baffles 75, 76 and 77 arranged in the upper interior part of the tank 10.

The element 73 is supported by braces 78 and 79 from a tubular shaft 74, in turn journaled on a shaft 23 by means of bearings 80 and driven by the motor 26 through gearing 81. Baffles 82 are arranged on the inner face of the centrifugal element 73 to facilitate the outward and upward impulsion of the solvent-coated droplets 70 for discharge through the annular throat, between the baffles 87 and 88, into a suitable collector (not shown) from which a chute leads to the separator C.

A conical baffle 75 is arranged with its small end closely spaced to the lower end of the centrifugal element 73. Its lower larger end is disposed slightly within the upper end of the inverted frusto-conical baffle 76. The baffle 77 is shown opposed and rigidly connected to the baffle 76, the two spanning the diameter of the tank 10 and being anchored thereto. These three baffles coact to deflect the mother liquor and any suspended sediment away from the rising droplets 70 of the freezer liquid, as such liquor and sediment gravitate to the bottom of the tank.

The modifications shown in Figs. 6 and 7 are designed for use in recovering a gaseous solute. The one is for use where the immiscible freezer liquid is of less specific gravity than the treated solution. The other is for use where the freezer liquid is of greater specific gravity than the treated solution. The form shown in Fig. 6 is substantially the same as that shown in Fig. 1, except that the upper end of the tank and the chute connection from the extractor B to the separator C are made gas-tight and a gas discharge conduit 84 leads off from the top of the extension 41 to a suitable gas storage receptacle.

For the latter of the above noted procedures (where the specific gravity of the freezer liquid is greater than that of the solution), considerable modification has to be made of both the receptacle A and the extractor B. In the illustrated arrangement, the perforate plate 16, which defines a portion of the distributing injector chamber 17, inlet 21 and the de-icing blades and blocks (37—39) together with the separating mechanism therefor are all arranged at the top of the tank 10. An Archimedes screw 71, preferably having a perforated web spiral, is arranged along one side of the tank 10 to convey the solvent-coated droplets 70 to the top of the tank for discharge through an enclosed chute 72 to the separator C. In this instance, the top of the tank 10 of course has to be made gas-tight and a gas discharge conduit 84 provided leading to a suitable gas collecting receptacle.

The character of a separator C suitable for removing the frozen solvent from the droplets of freezer liquid will be determined by the end results sought in extracting the solvent from a solution.

If both the solvent and the freezer liquid are to be recovered in their liquid form, the separator may be made to effect that operation thermally. If, however, the solvent is to be recovered in its solid form, the separation of the solvent and the freezer liquid can be made mechanically by crushing and then separating the substances by either screening or centrifuging.

The separator C herein shown is constructed for thermal separation since that procedure is most practical wherein this process and apparatus are used for concentrating fruit and vegetable juices or other food products.

As shown, the separator comprises a tank 60 divided by a perforated partition 61 into upper and lower compartments 63 and 64. In the upper of these compartments is arranged a suitable heating coil by means of which the frozen solvent is melted. Drain conduits 65 and 67, respectively controlled by valves 66 and 68, are connected to communicate with the compartment 64 at different levels so as to separately drain off the fluid solvent and the fluid freezer liquid. A valve-controlled discharge conduit 58 is connected to the bottom of the tank 60 so that as occasion may require, accumulations may be extracted.

The operation of any of the herein shown modifications embodying this invention, for carrying out this improved process for any of the defined purposes, is practically the same and is essentially as follows:

The dilute solution 69 is introduced into the receptacle 10 through the inlet line 21. In practice, the temperature of the solution is only a few degrees above its freezing point. At the same time that a supply of the dilute solution is being introduced into the receptacle 10, the cold immiscible liquid, which is to be infused through the solution 69, flows into the distributing injector chamber 17 through the inlet line 18. This liquid entering the chamber 17 preferably is maintained under a small head of pressure to insure a positive flow of the liquid through the apertures 20 in the plate 16. When, as generally is the case, the specific gravity of this liquid is less than that of the dilute solution 69 in the receptacle 10, the small droplets or spheroids 70 as they leave the apertures 20 in the plate 16 ascend through the dilute solution 69. Since the droplets 70, as they emerge from the apertures 20, are at a temperature which is considerably below the freezing point of the solvent of the solution 69, these droplets 70 become encrusted with a coating of the frozen solvent, as they pass upwardly to the upper surface of the solution 69. As solvent is removed from the solution the specific gravity of the solution normally increases so that the more highly concentrated solution settles into the bottom portion of the receptacle 10 and the sump 13, from which it may be removed through the line 14. Thus there is a counterflow of ascending droplets and descending solution in the receptacle 10, to effectuate an efficient heat transfer between the solution and the immiscible liquid comprising the droplets 70.

Throughout the process the motor 26 drives the shaft 23 in a counterclockwise direction, as viewed in Fig. 2, whereby the impeller wheel 54 sweeps the encrusted droplets 70 from the main receptacle 10 into the side extension 41. As the conveyor belt 48 moves upwardly it carries with it the encrusted droplets 70 and discharges them onto the chute 59. When an apparatus such as shown in Figs. 1 and 6 is used, a suitable solution is introduced to the spray head 55, through the line 56, which acts to wash the droplets 70 as they move upwardly on the belt 48. Since the belt 48 is made from a perforate material, this wash solution drains from the droplets 70, so that said droplets are substantially dry as they are discharged onto the chute 59. The wash solution flowing from the spray head 55 mixes with the solution in the receptacle 10, and is subsequently concentrated.

Of course, it will be understood that when use is made of a freezer liquid of greater specific gravity than that of the solution being treated, the freezer liquid will be introduced near the top of the tank 10, as indicated in Fig. 7. The droplets of this freezer liquid will descend rather than ascend through the solution. However, the action taking place otherwise will be the same as that just described, except for the further fact that the solvent-coated droplets will be separated from the solution at the bottom of the tank.

As the solvent-coated droplets 70 enter the upper compartment 63 of the separator unit C, they are heated by introducing steam or hot water into the coil 62. This causes the frozen solvent on the droplets 70 to melt and the solvent and the immiscible liquid drain into the lower compartment 64 through the perforated partition 61. Due to their immiscibility and different specific gravities these two liquids separate into two strata. The upper strata, which is the immiscible liquid from which the droplets 70 are formed, is carried off through the upper drain line 65, while the solvent, being of greater specific gravity, is carried off through the lower drain line 67.

Since the freezer liquid in the distributing chamber 17 and the plate 16 are at a very low temperature, there is a tendency for the exterior surface of the plate 16 to become encrusted with frozen solvent and clog the apertures 20. This is prevented from occurring to any substantial degree by the constant rotation of the shafts 23 and 29. This causes the scraper blades 37 to continually move around the ring-shaped plate 16 and sweep it free of the freezing solvent. While breaking up and removing freezing solvent from the plate 16, the scraper blades 37, themselves may have a tendency to become coated with frozen solvent. This is prevented by the constant reciprocation of the shaft 29 which causes the blocks 39 to move to and fro along the blades 37.

It will be obvious to those skilled in this art that any of the modifications herein shown is well adapted to the continuous processing of solutions. The flow of dilute solution through the inlet line 21 and spray head 55 would be balanced with the flow of fluids into the distributing chamber 17 through the line 18, to provide for the desired degree of concentration of the dilute solution in the receptacle 10. The flow of concentrated solution through the drain line 14 is of course controlled by means of the valve 15, in keeping with the rate of flow through the aforesaid lines 21, 56 and 18. The overflow line 46 acts to maintain a uniform level of solution 69 within the receptacle 10. While the various valves 22, 19, 15 and 47 in their respective lines 21, 18, 14 and 46 are shown to be of the hand operated type, their operation obviously can be coordinated through automatic control devices and systems, to maintain the various rates of flow and levels automatically. In addition, the liquid which is drained from the separating unit C through the drain line 65 may be reintroduced into the distributing chamber 17, after having been dried in the conventional manner and refrigerated to the desired temperature.

While I have described specific examples of my method, and shown and described certain possible embodiments of apparatus for carrying my method into effect, it is to be understood that these examples and embodiments have been given by way of illustration only, and that other modifications, changes and rearrangements of the details described and shown therein may be made without departing from the spirit of the invention, the scope of which is defined in the appended claims.

I claim:

1. The process of concentrating orange juice which comprises the steps of cooling orange juice to about $+5°$ C., introducing into the orange juice near the bottom thereof a continuous stream of droplets of deodorized kerosene-free mineral oil having a temperature of about $-20°$ C., and removing from near the top of the orange juice the ice-encrusted droplets thereby formed.

2. The process of concentrating grape juice which comprises cooling grape juice to about $+5°$ C., continuously introducing thereinto near the bottom thereof droplets of light mineral oil cooled to about $-15°$ C., continuously removing from near the top thereof the ice-encrusted droplets thereby formed, continually adding grape juice to the top thereof, and continually removing the concentrated grape juice from the bottom thereof.

3. In a process for concentrating fruit juices and vegetable juices wherein the same is cooled to its freezing point, the improvement which comprises thereafter introducing into said foodstuff droplets of non-toxic liquid coolant colder than, immiscible with, and of specific gravity different from, said foodstuff, thereby freezing ice out of said foodstuff.

4. In a process for concentrating fruit juices and vegetable juice wherein a body of juice is cooled to its freezing point, the improvement which resides in percolating through said juice droplets of non-toxic liquid coolant colder than, immiscible with, chemically inert toward, and of different density than, said juice, whereby ice is formed from said juice by direct contact heat transfer between said juice and said coolant.

5. In a process for concentrating fruit juice and vegetable juice wherein the same is first cooled to its freezing point, the improvement which comprises thereafter diffusing into said liquid foodstuff droplets of liquid, non-toxic coolant colder than, substantially insoluble in, substantially non-reactive with, and of density different from, said liquid foodstuff, thereby generating ice from said liquid foodstuff by direct contact with said coolant, and removing said ice and said coolant from said liquid foodstuff.

6. The process of claim 5, and including the further steps of heating the separated mixture of ice and coolant until the ice melts, separating the coolant from the water thereby formed, cooling said coolant until it is colder than said liquid foodstuff, and recycling said cooled coolant through said liquid foodstuff.

7. In a continuous process for concentrating a body of citrus juice wherein the same is first cooled to its freezing point, the steps of: continuously introducing into the lower part of said body droplets of non-toxic liquid coolant colder than, immiscible with, and less dense than said citrus juice, thereby forming ice by direct contact of said juice with said coolant; continuously removing said ice and said coolant from the upper part of said body; continuously adding citrus juice to the upper part of said body; and continuously removing concentrated citrus juice from the lower part of said body.

8. An apparatus for freezing solvents from solutions comprising a receptacle, vertically spaced conduits for admitting the solution and discharging the concentrate, means for diffusing into the solution in said receptacle droplets of a liquid immiscible with said solution, having a specific gravity different from that of said solution, a freezing point below the freezing point of said solution, and a temperature between said freezing points, and means vertically remote from the means for discharging the concentrate for extracting the solvent-coated droplets emerging from said solution.

9. An apparatus of the type defined in claim 8, wherein means is associated with the solvent-coated droplet-discharge conduit for separating said solvent and liquid.

10. An apparatus for concentrating a dilute aqueous solution of fruit or vegetable juices comprising a receptacle containing a quantity of dilute juice, vertically spaced conduits for admitting a supply of dilute juice and for removing the concentrate, means for diffusing into said dilute solution droplets of a non-toxic, water-immiscible freezer liquid of lower specific gravity and temperatures than said solution, and means vertically spaced from the concentrate removing conduit for extracting the resulting solvent-coated droplets from the surface of said solution.

11. Apparatus for concentrating aqueous nutrients, comprising a receptacle, vertically spaced conduits respectively for introducing aqueous nutrient thereinto and for removing concentrate therefrom, non-toxic, water-immiscible liquid of density different from said nutrient and of freezing point substantially lower than said nutrient, means for continuously introducing droplets of said liquid into said receptacle, and means vertically spaced from said introducing means, for removing from said nutrients said droplets and ice encrusted thereon.

References Cited in the file of this patent

UNITED STATES PATENTS

| | | |
|---|---|---|
| 119,252 | Twinning | Sept. 26, 1871 |
| 2,368,141 | Johnsson | Jan. 30, 1945 |
| 2,393,475 | McKinnis | Jan. 22, 1946 |
| 2,436,218 | Malcolm | Feb. 17, 1948 |
| 2,443,867 | Noyes | June 22, 1948 |
| 2,503,695 | Webb et al. | Apr. 11, 1950 |
| 2,507,632 | Hickman | May 16, 1950 |

FOREIGN PATENTS

| | | |
|---|---|---|
| 178,013 | Switzerland | Sept. 2, 1935 |